United States Patent [19]
Simpson

[11] Patent Number: 4,796,654
[45] Date of Patent: Jan. 10, 1989

[54] SOIL MOISTURE CONTROL SYSTEM AND METHOD

[76] Inventor: Bobby R. Simpson, 10072 Trask Blvd., Garden Grove, Calif. 92643

[21] Appl. No.: 141,946

[22] Filed: Jan. 11, 1988

Related U.S. Application Data

[63] Continuation-in-part of Ser. No. 852,323, Apr. 15, 1986, Pat. No. 4,718,446.

[51] Int. Cl.[4] .............................................. A01G 25/16
[52] U.S. Cl. ............................... 137/78.3; 137/624.11; 239/64
[58] Field of Search ................... 239/63, 64; 137/78.3, 137/624.11

[56] References Cited

U.S. PATENT DOCUMENTS

| | | | |
|---|---|---|---|
| 3,105,214 | 9/1963 | Blythe et al. | 324/65 P |
| 3,991,375 | 11/1976 | Riggs et al. | 239/64 |
| 4,194,691 | 3/1980 | Birnbach et al. | 239/63 |
| 4,304,989 | 12/1981 | Vos et al. | 137/624.2 |
| 4,613,764 | 9/1986 | Lobato | 137/78.3 |
| 4,657,039 | 4/1987 | Bireley et al. | 137/78.3 |
| 4,693,419 | 9/1987 | Weintraub et al. | 137/78.3 |

Primary Examiner—A. Michael Chambers
Attorney, Agent, or Firm—Allen A. Dicke, Jr.

[57] ABSTRACT

Soil moisture control system senses subsoil moisture by AC conductivity and turns on irrigation valve when the sensor indicates the need for additional moisture. An adjustment is connected to the sensor to adjust the level at which adequate soil moisture is signaled.

12 Claims, 2 Drawing Sheets

SOIL MOISTURE CONTROL SYSTEM AND METHOD

CROSS REFERENCE

This application is a continuation in part of my prior application Ser. No. 852,323, filed Apr. 15, 1986 for "Time and Moisture-Responsive Sprinkler Control System", now U.S. Pat. No. 4,718,446 issued Jan. 12, 1988.

FIELD OF THE INVENTION

This invention is directed to a soil moisture control system particularly wherein an alternating current soil moisture sensor is buried in the soil and a circuit is connected thereto to measure the apparent moisture to control a sprinkler valve.

BACKGROUND OF THE INVENTION

Irrigation is needed in many arid areas for supplying water to architectural vegetation. Greenery is often planted around homes, commercial buildings and apartment developments to provide an attractive outdoor appearance. In order to minimize the manual labor of such irrigation and to avoid loss of plants when irrigation is forgotten, clocks are often used to control electrically actuated valves which supply water to the irrigation system. Such clocks have been developed to a point where one or more days of the week can be selected for sprinkling. Furthermore, the time of day and duration of sprinking can also be selected. Such clocks sometimes have a plurality of terminals which can be connected to different water control valves for the control thereof. Such terminals are often referred to as stations. The clock usually sequentially energizes the stations, and the clock can be adjusted so that each station has its own individual adjustment of on time. In this way, irrigation of a number of different areas, each served by a station and a sprinkler valve, can be employed to deliver water in accordance with the program determined by the clock and independent of ground moisture. It would be desirable to conserve water by limiting the delivery of irrigation water when the ground moisture is adequate.

Prior soil moisture sensors have incorporated a pair of sensor fingers buried in the soil, together with a control system which applies a direct voltage applied thereacross. The application of direct current to the sensor fingers causes electrolysis and hydrolysis at the sensor. The hydrolysis and electrolysis effect breaks the bond between hydrogen and oxygen in the soil moisture. In turn, the hydrogen ion both causes conduction and appears to enhance the ionization of chloride in the chloride and other salts in the soil. The prior direct current type of sensor is not sensing water, but the ionized salts. Furthermore, the ionized salts are not necessarily proportional to the moisture in the soil in that region. The buildup due to electrolysis adjacent the sensor tends to increase the electrical transmissivity of that portion of the soil due to ionization. This increase in ionization in that region disturbs the reading so that the DC current through the probe is not proportional to the water moisture. The current stays the same while the soil becomes less moist over a period of time. Eventually, the sensor alloys and is conductive even though the soil is quite dry in the region of the sensor. Thus, the employment of direct current to sensor fingers is not reliable over a period of time, for example in the time period of six months to a year.

SUMMARY OF THE INVENTION

In order to aid in the understanding of this invention, it can be stated in essentially summary form that it is directed to a soil moisture sensor control system with an AC control circuit connected to a soil moisture sensor so that the control circuit in the system permits the turn-on of water when the ground moisture is low and prevents the turn-on of water when ground moisture is adequate.

It is thus an object and advantage of this invention to provide a sprinkler control system which is moisture responsive to permit actuation of the sprinkler system when a ground moisture sensor calls for water.

It is a further object and advantage of this invention to provide a moisture responsive sprinkler control system which can be connected to a sprinkler control clock so that the clock provides time control of sprinkler actuation and a moisture responsive circuit permits turning on of the sprinkler when the ground moisture is inadequate.

Other purposes and advantages of this invention will become apparent from a study of the following portion of the specification, the claims and the attached drawings.

DESCRIPTION OF THE PREFERRED EMBODIMENT

Figure 1:
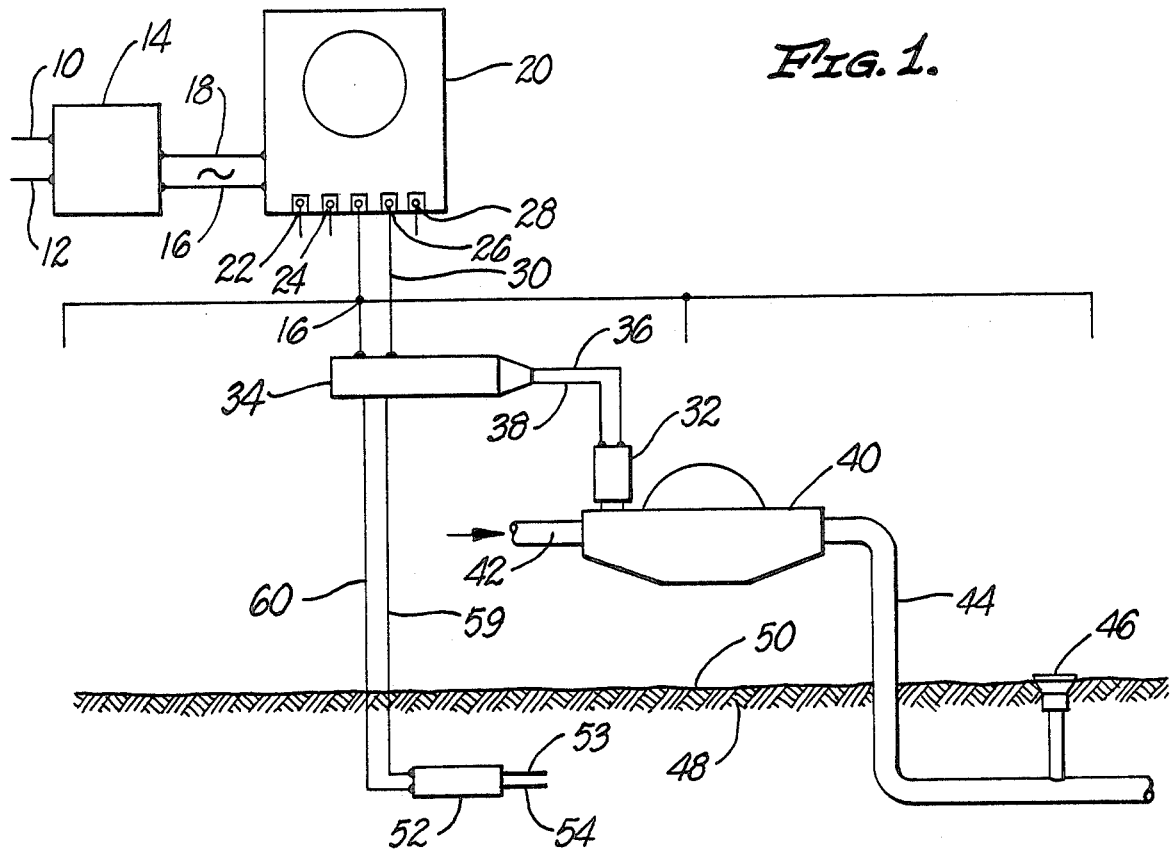
FIG. 1 is a schematic view of a sprinkler system which has both time and moisture sensing elements therein to control the sprinkler valve.

Conventional 60 cycle single phase 120 volt alternating current electric power is supplied in lines 10 and 12 to transformer 14. In view of the fact that much of the sprinkler wiring is outdoor, voltage below 24 volts at the transformer output is desirable. The transformer output is in ground line 16 and 24 volt power line 18. The ground line 16 passes right through clock timer 20 so that it can supply a plurality of loads. Power line 18 may also supply power to operate the clock mechanism in the clock timer structure. The clock carries switches by means of which, on particular selected days and particular selected hours, the output stations are sequentially energized for predetermined lengths of time. Output station connections 22, 24, 26 and 28 are shown. Other clock time structures may have fewer such station connections. Output line 30 is connected to station 26. In the conventional sprinkler control circuit, the lines 16 and 30 would be directly connected to solenoid 32. In this case, those lines are connected through control circuit 34 to become lines 36 and 38.

Sprinkler valve 40 receives water from water pipe 42 which contains water under pressure. Sprinkler pipe 44 is connected to the output of sprinkler valve 40. Sprinkler pipe 44 is a distribution pipe which distributes water to a plurality of irrigation outflow water points such as sprinkler head 46. Sprinkler head 46 is mostly buried in the soil 48 with the top of its head substantially flush with the soil surface 50. Such sprinkler heads are suitable for lawn and serve merely as an illustration of one manner in which irrigation water may be delivered. The sprinkler head may be of other characteristics to deliver water as a spray, as a surface flooding delivery, or as a drip delivery, and the like. When solenoid 32 is energized, the valve is open and irrigation water is delivered.

Figure 3:
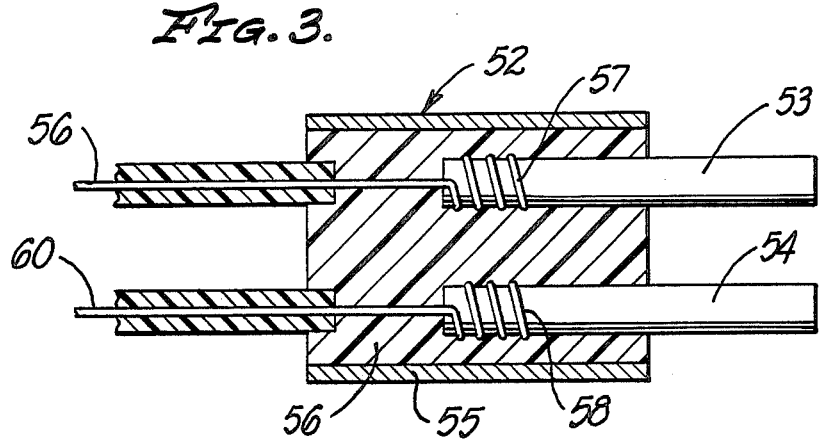
FIG. 3 is an enlarged longitudinal section through a preferred embodiment of the soil moisture sensor.

Moisture sensor 52, shown in FIG. 3, has first and second spaced graphite rods 53 and 54 which are positioned in tube 55 and are supported and electrically isolated from each other by potting 56. Springs 57 and 58 are twisted onto the graphite rods and cut into the outer surface of the rods as they are applied and resiliently grasp the rods to make firm electrical contact. The graphite rods have a very low electrical resistance, in the order of $30 \times 10^{-5}$ ohm-inches. The graphite rods in the test unit are made of compressed petroleum coke and are thought to have a lower axial resistivity than radial resistivity. Furthermore, the surface of the graphite rods does not appear to build up a material which leads to degradation of films or layers which reduce sensor sensitivity. In the preferred embodiment, the graphite rods are ¼ inch in diameter, spaced apart about 0.375 inch, and extend about 1 inch out of the potting material. Moisture sensor leads 59 and 60 are respectively connected to the springs. The rods are exposed in the soil and, when there is moisture in the soil, the moisture is ionized because of its impurity. Thus, with a higher moisture content in the soil, the resistance between rods 53 and 54 decreases, as later described, with respect to FIG. 4.

Figure 4:
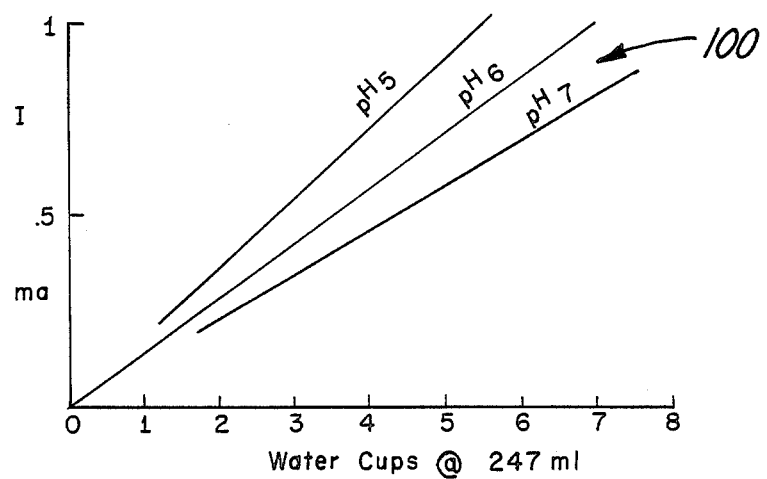
FIG. 4 is a graph showing current versus moisture content in a soil sample.

FIG. 4 shows a group of curves 100 which show the proportionality between soil water content and sensor current, and show the conductivity differences as a function of pH. The ordinate of the graph is sensor current in milliamperes. For a sensor having ¼ inch carbon probes exposed to the soil with a ⅜ inch spacing therebetween and with 24 voltage applied thereto, the current versus moisture content is indicated. The soil in which the test was made was one-half cubic foot of loamy soil in a waterproof vessel 12 inches square and 6 inches deep. The abscissa of the curve is the amount of water, in cups, added to the soil. Soil pH was 6 for the center curve. It is seen that a linear relationship is achieved between moisture content and sensor current.

Figure 5:
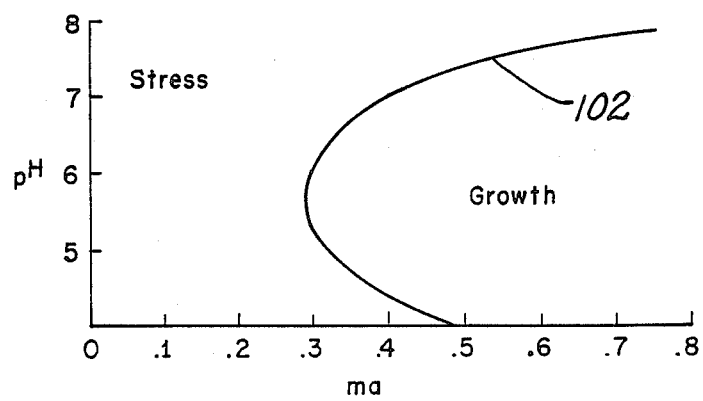
FIG. 5 is a graph showing soil pH versus sensor current related to plant stress.

It must also be recognized that, with different soil pH, different amounts of soil moisture are necessary for proper growth. FIG. 5 shows curve 102 which separates an area of plant stress to the left of the curve with good growth to the right of the curve. At a pH of 6, a sensor reading of 0.3 indicates a minimum amount of water to prevent plant stress.

Figure 2:
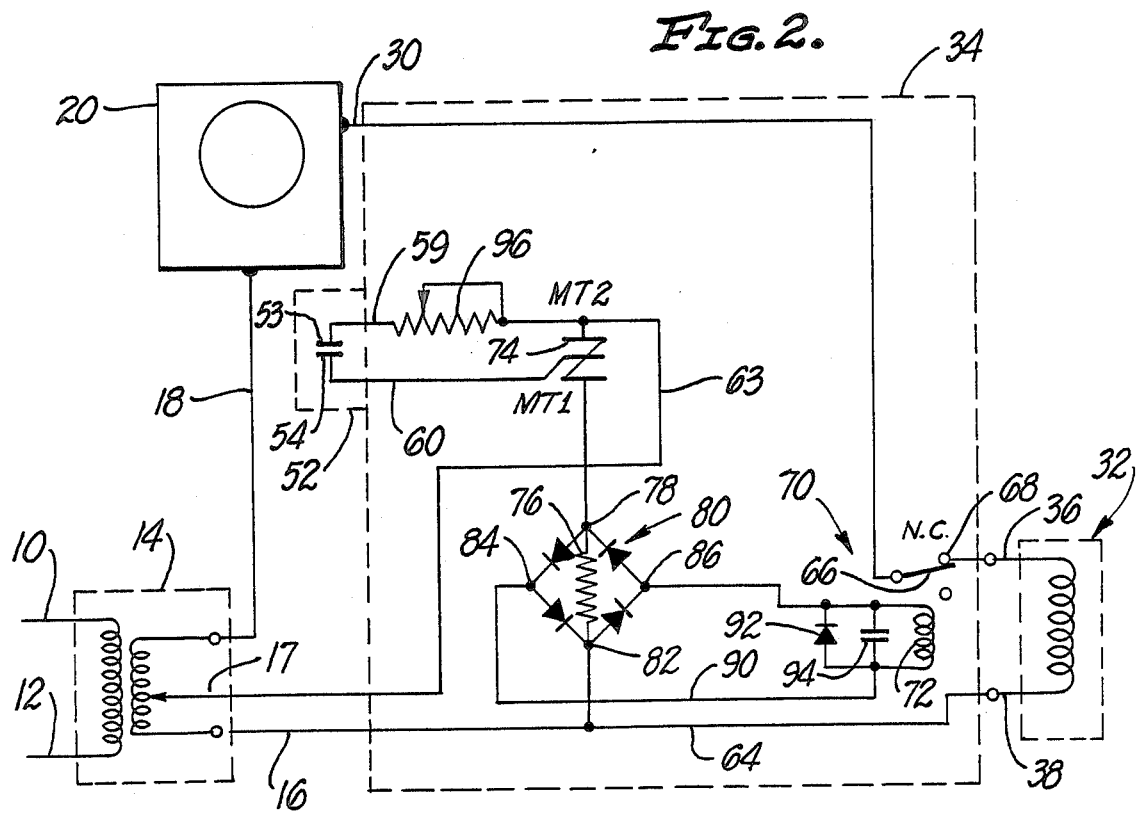
FIG. 2 is an electrical schematic of the control system.

FIG. 2 shows the control circuit 34 in more detail. The output line 30 from the clock timer is connected to switch contact, and the ground line 16 is connected to bus 64. Bus 64 is connected to line 38 of solenoid 32. When relay 70 is deenergized, switch contact 66 is connected to contact 68 of relay 70, and the contact 68 is connected through line 36 to solenoid 32. The contacts 66 of relay 70 are normally closed so that when de-energized, the solenoid 32 is energized. Solenoid coil 72 is part of relay 70 and actuates moving contact 66.

Bus 63 is connected to center tap 17 to provide a convenient 12 volts. Serially connected between buses 63 and 64 is triac 74 which has its terminal MT2 connected to bus 63 and its terminal MT1 connected to resistor 76 at terminal 78. The resistor is also connected to AC terminal 82 of full wave rectifier bridge 80. The bridge is composed of diodes and has its other AC input terminal 82 connected to bus 64. The rectifier bridge 80 has DC output terminals 84 and 86 respectively connected to DC lines 88 and 90. Connected in parallel across these lines are free-wheeling diode 92, capacitor 94 and relay coil 72. This set of connections is such that when triac 74 is non-conducting, the AC voltage across buses 63 and 64 is fully applied across the triac 74.

The MT2 point of triac 74 is connected through potentiometer 96 to the line 59, and the line 60 is connected to the gate of triac 74. With the triac 74 non-conducting, the AC voltage across buses 63 and 64 is connected to the series side circuit of potentiometer 96, sensor rods 53 and 54, and the gate of triac 74. The current through that circuit is controlled by the potentiometer 96 and by the moisture between the sensor rods.

FIG. 2 shows the potentiometer 96 and the sensor rods in series between the terminal MT2 and gate of the triac 74. Potentiometer 96 is adjusted in accordance with the setting shown in FIG. 5 so that, when the sensor current reaches 0.3 milliamps (for pH 6), the triac 74 turns on. When the triac 74 is conducting, rectifier bridge 80 is fed and supplies actuating current to solenoid coil 72. The solenoid coil is energized, opening the contacts 66–68 to deenergize the water valve solenoid 32 to turn off the water. Thus, for a particular setting of potentiometer 96 for a preset value of low soil moisture level, the valve solenoid is actuated. This is only done when the clock 20 also calls for sprinkling. When the current at the probe indicates adequate moisture, no sprinkling occurs. In this way, sprinkling is performed when the clock calls for sprinkling and the soil moisture level is sufficiently low to indicate sprinkling is required. The potentiometer 96 can also be used as an override to call for sprinkling even when the probe indicates adequate moisture.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A soil moisture control system comprising:
    an alternating current source for supplying alternating current;
    a switch and a magnetic coil serially connected to said alternating current source, said magnetic coil being for connection to an irrigation water valve so as to control the opening and closing of the water valve;
    a soil moisture sensor having first and second spaced electrically conductive graphite rods forming probes for sensing the moisture in soil between said probes, first and second resilient metal springs wrapped around the cut into said first and second graphite rod probes, respectively, said first and second metal springs being connected to said alternating current source so that alternating current passes between said probes when said sensor is immersed in moist soil, said sensor being connected to control said switch; and
    including a gate circuit connected to said switch for controlling said switch and said soil moisture sensor being connected to said gate circuit so that said switch changes states when said sensor detects a predetermined amount of moisture in the soil between said probes so that said soil moisture control system inhibits delivery of irrigation water to the soil when soil moisture is adequate.

2. The soil moisture control system of claim 1 wherein said gate circuit is adjustable so that change of state of said switch can be adjusted in accordance with desired soil moisture content.

3. The soil moisture control system of claim 2 wherein said switch is a triac having two terminals and a gate and said sensor is connected between one of said terminals and said gate of said triac.

4. The soil moisture control system of claim 2 wherein said adjustable gate circuit can be adjusted so that said sensor always indicates the need for sprinkling.

5. A soil moisture control system comprising:
an alternating current source for supplying alternating current;
a switch and a magnetic relay coil connected to actuate relay contacts which control the flow of power to the solenoid of a water control valve so as to control the opening and closing of said water valve;
a soil moisture sensor having first and second spaced electrically conductive graphite rods forming probes for sensing the moisture in soil between said probes, first and second resilient metal springs wrapped around and cut into said first and second graphite rods probes, respectively, said first and second metal springs being connected to said alternating current source so that alternating current passes between said probes when said sensor is immersed in moist soil, said sensor being connected to control said switch; and
a gate circuit connected to said switch for controlling said switch, said gate circuit comprising a triac having one of its main terminals connected through a variable resistor to said first probe and having its gate connected to said second probe and having its main terminals connected to actuate said switch so that said switch changes states when said sensor detects a predetermined amount of moisture in the soil between said probes so that said soil moisture control system inhibits delivery of irrigation water to the soil when soil moisture is adequate.

6. The soil moisture control system of claim 5 wherein said coil of said water control valve is connected between a first bus connected to said alternating current source and a second bus connected to a clock.

7. The soil moisture control system of claim 5 wherein said relay coil is connected to the output of a rectifier, the input of said rectifier being connected to said switch so that said sensor controls said switch, said switch powers said rectifier and said rectifier powers said coil.

8. The soil moisture control system of claim 6 wherein said gate circuit is adjustable so that change of state of said switch can be adjusted in accordance with desired soil moisture content.

9. The soil mixture control system of claim 8 wherein said adjustable gate circuit can be adjusted so that said sensor always indicates the need for sprinkling.

10. The method of control of irrigation water comprising the steps of:
preparing a ground moisture sensor having first and second spaced carbon rod probes and making electrical contact with the carbon rod probes by wrapping a separate metallic spring around each of the probes so as to cut into the carbon rod probes;
inserting sensor having the first and second spaced probes into soil in which moisture is to be sensed;
applying alternating current across said spaced carbon probes through the contact springs;
measuring current so that when the current between the probes changes across a critical value a signal is emitted; and
controlling a sprinkler valve in response to the emitted signal.

11. The soil moisture control method of claim 10 further including the step of adjusting the voltage applied to the probe so that the transition point is adjusted with respect to soil moisture.

12. The soil moisture control method of claim 11 wherein the step of signaling the transition includes the step of signaling a relay and the further step of signaling to the water control valve from the relay.

* * * * *